Sept. 14, 1943.  B. BANNISTER  2,329,381
FISHING REEL
Filed Dec. 9, 1940
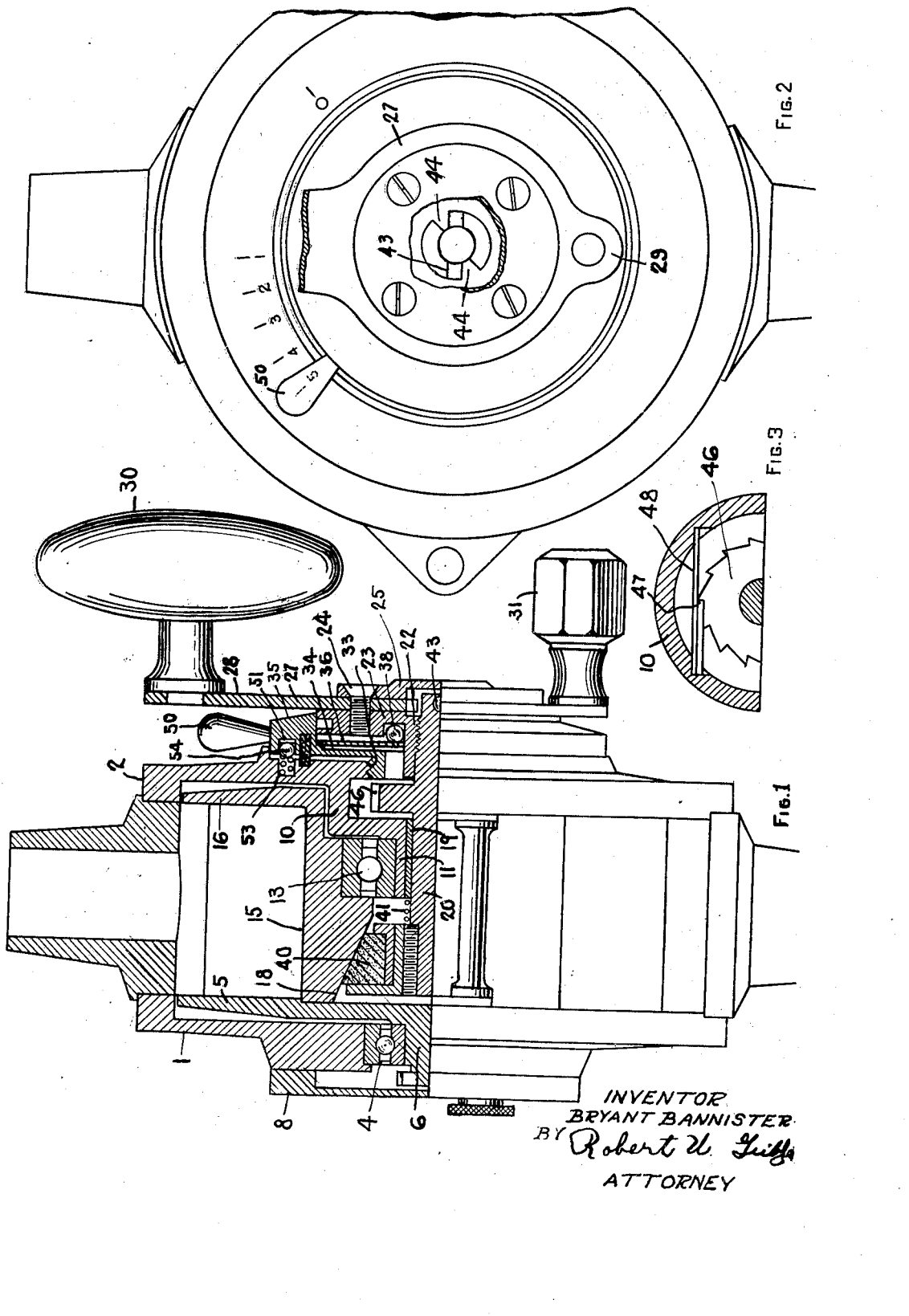
INVENTOR
BRYANT BANNISTER
BY Robert U. Griff
ATTORNEY Patented Sept. 14, 1943

2,329,381

UNITED STATES PATENT OFFICE 2,329,381

FISHING REEL

Bryant Bannister, Mount Lebanon, Pa.

Application December 9, 1940, Serial No. 369,208

8 Claims. (Cl. 242—84.7)

This invention relates to fishing reels and more particularly to reels such as are employed in deep salt water fishing for large game fish, for example, the giant tuna, marlin, swordfish, tarpon, sharks, and the like.

In this style of fishing, the skill of the angler is measured either by the strength of the line used with respect to the weight of the fish landed or by the time required to land a fish with a prescribed weight of tackle. In either case it is highly desirable to have under constant control the braking effect of the reel which, in turn, largely controls the line tension and movement of the fish. This control should be such that it permits of considerable variation at the will of the operator during the playing of a fish an, also that the amount of such braking effect should be at all times known with moderate definiteness. In addition, provision should be made to prevent the operator in manipulating the brake to unintentionally reduce the line tension to zero, thereby producing a free-spooling condition. If such free-spooling should suddenly occur while a fish is pulling heavily on the line, overrunning of the spool would likely occur and result in a back lash and a snarled line.

In the conventional star drag type of reel the braking effect can be varied by adjustment of the star drag, but the adjusting means from which the name "star drag" is derived is a star wheel adjacent to the reel crank and which rotates with the crank. It is, therefore, difficult, if not impossible, to set this drag at any prescribed point while playing a fish.

In another and more recent design, the crank is provided with a certain amount of so-called "lost motion" whereby it is possible to turn the crank from driving position in a reverse direction to gradually reduce the braking effect. In this case an adjustment for the maximum braking effect is also provided by means of an adjusting knob or wheel which rotates with the crank. It therefore possesses the same weakness as the star drag reel.

It is among the objects of the present invention to provide a fishing reel wherein the line tension can be varied by a simple movement of the driving crank but with the maximum and minimum line tension obtainable controlled by an independent and non-rotating means.

Another object is the provision of a fishing reel possessing the foregoing characteristics with the crank movement able to reduce line tension to zero, or to a free-spooling condition, only when the independent tension limiting means has previously been adjusted to a certain position. When in all other positions it is impossible to reduce line tension to zero by manipulation of the driving crank.

To the accomplishment of these and other desirable objects and purposes, I have designed the present, preferred embodiments of the invention presented in the accompanying drawing forming a part of this specification and to which reference should be had in connection with the following detailed description, and in this drawing, for simplicity, like reference numerals have been employed to designate the same parts throughout the several views.

In said drawing:

Figure 1 is a composite view of which the lower half is a plan of the reel, while the upper half is a horizontal section through the center thereof.

Figure 2 is a side elevation with some of the elements which would normally appear therein being removed in the interests of clearer illustration.

Figure 3 is a sectional view of a part of the upper half taken along only 180 degrees and illustrating a detail.

Referring more particularly to the drawing, wherein there is illustrated a preferred form of fishing reel made in accordance with the teachings of the present invention, the numerals 1 and 2 designate side plates which are suitably held together and comprise a frame. The side plate 1 has a central aperture within which there is seated a ball bearing 4. Disposed within the frame and most adjacent the side plate 1 thereof is a spool side plate 5, the latter being provided with a hub portion 6 which extends through and is journaled in the ball bearing.

Secured on the outer face of the side plate 1 and over the central aperture thereof is a cover plate 8. Between the cover plate 8 and the outer end of the hub portion 6 of the spool side plate 5 is a click mechanism operated by a control element on the exterior of the cover plate 8; these instrumentalities as such forming no part of the present invention and being therefore neither fully illustrated nor further referred to hereinafter.

The side plate 2 of the frame of the reel also has a central aperture and relatively adjacent thereto is provided on its inner face with a right-angular flange 10 carrying a hub portion 11 of reduced diameter. On the hub portion 11 described immediately hereinbefore is disposed a ball bearing 13, the latter supporting for rotation the body portion or center 15 of the spool. One end of the body portion or center 15 of the spool abuts against the inner face of the spool side plate 5, while the other end thereof carries an integrally formed spool side plate 16.

That end of the body portion or center 15 of the spool which abuts against the inner face of the spool side plate 5 has formed therein an axial interior coniform recess 18, the purpose of which will be later described.

Disposed coextensively within the hub portion 11 of the side plate 2 is a bushing 19. Journaled in this bushing 19 and projecting from both of its end is a rotatable shaft 20, one end of which occupies the axial interior coniform recess 18 in the body portion or center 15 of the spool and terminates adjacent the inner face of the spool side plate 5. The other end of the rotatable shaft 20 projects through and extends from the central aperture in the side plate 2 and carries in screw-threaded engagement with its outboard end a collar 22, the latter carrying on its outer end a radial annular flange 23.

Secured to the radial annular flange 23 by means of spaced screws 24 is a cover plate 25, while clamped between the said radial annular flange 23 and the said cover plate 25 is a flat ring 27, the latter having integrally formed at diametrically opposite points thereon a long arm 28 and a short arm 29 which occupy the same plane, and have attached to their respective outer ends a large crank handle 30 and a short crank handle 31.

Screw-threadedly disposed in the central aperture of the side plate 2 is a collar 33 having integrally formed on the periphery thereof a radial annular flange 34 terminating in a peripherally enlarged portion 35 which overhangs a portion of the periphery of the radial annular flange 23 carried by the collar 22 on the outer end of the rotatable shaft 20. This construction provides an annular space between the outer face of the radial annular flange 34 and the inner face of the radial flange 23 within which there is disposed a centrally apertured spring disc 36. The inner diameter of the centrally apertured spring disc 36 is slightly larger than the outside diameter of the collar 22 on the outboard end of the rotatable shaft 20, thereby enabling said disc to encompass the said collar. Immediately adjacent the periphery of the said collar 22, the inner face of the radial annular flange 23 thereon is provided with an annular groove within which there is disposed a ball bearing 38.

The thread connecting the outboard end of the rotatable shaft 20 with the collar 22 thereon is right-handed, whereby it will be perceived that when the flat ring 27 is, by means of either of the crank handles 30 or 31, given clockwise rotation, the rotatable shaft 20 will tend to move toward the said flat ring since there is relative motion between shaft 20 and collar 22 because shaft 20 resists turning due to frictional resistance and resistance of spood 15 to rotation when there is tension on the fishing line. Conversely, the flat ring 27 and collar 22 on the outboard end will tend to move toward the center of the rotatable shaft 20, but this motion is prevented by the ball bearing 38 which is disposed between the outer face of the centrally apertured spring disc 36 and the bottom of the annular recess on the adjacent face of the radial annular flange 23 within which the ball bearing is carried.

The thread carrying the collar 33 in the central aperture of the side plate 2 is also right-handed, whereby the rotation of the radial annular flange 24 in a clockwise direction will cause the said collar 33 to move inwardly toward the center of the reel; and, conversely, when rotated in a counterclockwise direction, will move outwardly with respect thereto. From the foregoing, it is believed apparent that the movement of the collar 33 and its associated elements, including the centrally apertured spring disc 36, will also move the collar 22 and the rotatable shaft 20 on the outboard end of which it is carried.

Disposed within the axial interior coniform recess in the body portion or center 15 of the spool, and carried on the adjacent end of the rotatable shaft 20, is an annular friction element 40, the periphery of which is shaped to conform to and adapted for contact with the said coniform recess 18. This friction element 40, which may be constructed of cork or other suitable material, is secured in any suitable way to the end of the rotatable shaft 20, and there is provided between it and the adjacent end of the bushing 19 a compression spring 41. This compression spring 41 is constantly under compression, and therefore tends at all times to maintain contact between the collars 22 and 33 through the ball bearing 38. Thus the rotatable shaft 20 and friction element 40 are free to move axially whereby the movement of the latter towards the middle portion of the spool brings the said friction element into frictional engagement with the coniform recess 18 in the body portion or center 15 of the spool, the friction increasing with an increase in pressure in that direction. Accordingly, the axial movement of the rotatable shaft 20 toward the side plate 1 of the frame will free the friction element 40 from contact with the coniform recess 18 in the body portion or center of the spool. Thus, with proper relative positioning of the collars 22 and 33, the rotation of either of the crank handles 30 or 31 in a counterclockwise direction will discontinue frictional contact between the friction element 40 and the coniform recess 18, thereby removing all but negligible resistance to the rotation of the spool which is comprised of the body portion or center 15 and the spool side plates 5 and 16. Under these conditions, the spool is said to be "free spooling."

As shown more clearly in Figure 2, the outboard end of the rotatable shaft 20 carries a cross pin 43 which projects radially at diametrically opposite points on the periphery thereof. On the inner surface of the flat ring 27 there is carried a pair of spaced and diametrically opposed projections 44, which, upon limited rotative movement of the flat ring 27, engage the cross pin 43 on the rotatable shaft 20.

Between the collar 22 and the inner end of the hub portion 11 of the right-angular flange 10 of the side plate 2, the rotatable shaft 20 carries an integrally formed ratchet wheel 46 which engages an abutment 47 on a flat spring 48 which is carried by the right-angular flange 10 on the side plate 2. This abutment 47 engages the teeth of the ratchet wheel 46 and prevents the counterclockwise rotation of the rotatable shaft 20 with respect to the side plate 2, and accordingly the frame of which it is part.

In order to effect preliminary adjustment between the collars 22 and 33, the peripherally enlarged portion 35 of the radial annular flange 34 on the outer end of the collar 33 carries an adjusting lever 50 which may be moved into positions designated at "0" and "1," "2," "3,"

"4," "5," the latter being scribed on the outer face of the side plate 2 as shown in Figure 2. Adjacent its periphery, the radial annular flange 34 on the outer end of the collar 33 has formed on its inner face an arcuate groove having a series of notches 51 corresponding with the disposition of the lever 50 at the indexed positions described hereinbefore. Facing the arcuate groove having the notches 51, the end plate 2 has formed in the outer face thereof a recess within which there is disposed a compression spring 53 at the outer end of which is a ball 54 which seats in the said notches 51 as the lever 50 is moved into different positions.

The pitch of the threads connecting the outboard end of the rotatable shaft 20 and the collar 22 carried thereon, together with the parts associated therewith, can be such that when either of the crank handles 30 or 31 is turned from the rearward position to the forward position where the projections 44 engage the cross pin 43 on the rotatable shaft 20, there is established contact between the friction element 40 and the coniform recess 18. When the lever 50 is in the position designated "0" (see Figure 2) and either of the crank handles in its rearward position, free spooling is obtained, but if either of the crank handles 30 or 31 is moved from rearward to the forward position, the rotation of the spool is to a small degree retarded since the rotatable shaft 20 cannot turn backwards, and the line on the spool comes off at the bottom. By moving the lever 50 to the position designated "1" the lost motion between the friction element 40 and the coniform recess 18 is elimiated, and even with the crank handles 30 or 31 in their rearward positions, a slight braking effect is produced, which braking effect can be increased by moving either of the crank handles in a clockwise direction. Thus, free spooling is only possible with the lever 50 in the position designated "0" regardless of the positions of the crank handles 30 and 31.

When the lever 50 is progressively moved to the positions designated "2," "3," "4," and "5," the maximum obtainable braking effect is increased, but at all times the movement of the crank handles 30 and 31 can vary the braking effect on the line from the maximum to a lesser degree. Therefore, when a fish is being "played," the operator can set the lever 50 to any position he deems desirable as maximum under the circumstances, and, in order to procure the action he desires on the part of the fish, may vary the braking effect simply by moving either of the crank handles 30 or 31. It is to be particularly noted, however, that the operator cannot inadvertently or otherwise reduce the braking effect to complete elimination thereof except when the lever 50 is in the position designated "0."

While I have shown and described certain specific embodiments of the present invention, it will be seen that I do not wish to be limited exactly thereto, since various modifications may be made without departing from the scope of the invention, as defined by the following claims.

I claim:

1. In a fishing reel, a stationary cylindrical element, a rotatable spool mounted peripherally of said stationary cylindrical element, a rotatable shaft extending through said stationary cylindrical element, a frictional driving element carried by said rotatable shaft and adapted for driving association with said rotatable spool, means for axially moving said frictional driving element into and out of the driving association aforesaid, means for enabling the rotation of said rotatable shaft, and normally stationary means for adjusting the axial disposition of said frictional driving element.

2. In a fishing reel, a stationary cylindrical element, a rotatable spool mounted peripherally of said stationary cylindrical element, a rotatable shaft extending through said stationary cylindrical element, a frictional driving element secured to said rotatable shaft and adapted for driving association with said rotatable spool, means for axially moving said rotatable shaft to thereby move said frictional driving element into and out of the driving association aforesaid, means for enabling the rotation of said rotatable shaft, and normally stationary means for adjusting the axial disposition of said rotatable shaft.

3. In a fishing reel, a stationary cylindrical element, a rotatable spool mounted peripherally of said stationary cylindrical element, a rotatable shaft extending through said stationary cylindrical element, a frictional driving element carried by said rotatable shaft and adapted for driving association with said rotatable spool, means for axially moving said frictional driving element into and out of driving association aforesaid, means for enabling the rotation of said rotatable shaft in one direction, means operable by the opposite rotation of said rotatable shaft to influence said frictional driving element out of driving association with said rotatable spool, and normally stationary means for adjusting the axial disposition of said frictional driving element.

4. In a fishing reel, a stationary cylindrical element, a rotatable spool mounted peripherally of said stationary cylindrical element, a rotatable shaft extending through said stationary cylindrical element, a frictional driving element secured to said rotatable shaft and adapted for driving association with said rotatable spool, means for axially moving said rotatable shaft to thereby move said frictional driving element into and out of the driving association aforesaid, means for enabling the rotation of said rotatable shaft in one direction, means operable by the opposite rotation of said rotatable shaft to influence said frictional driving element out of driving association with said rotatable spool, and normally stationary means for adjusting the axial disposition of said rotatable shaft.

5. In a fishing reel, a stationary cylindrical element, a rotatable spool mounted peripherally of said stationary cylindrical element and providing an axial coniform recess, a rotatable shaft extending through said stationary cylindrical element, a coniform frictional driving element carried by said rotatable shaft and adapted for driving association with the axial coniform recess in said rotatable spool, means for axially moving said frictional driving element into and out of the driving association aforesaid, means for enabling the rotation of said rotatable shaft, and normally stationary means for adjusting the axial disposition of said frictional driving element.

6. In a fishing reel, a stationary cylindrical element, a rotatable spool mounted peripherally of said stationary cylindrical element and providing an axial coniform recess, a rotatable shaft extending through said stationary cylindrical element, a coniform frictional driving element secured to said rotatable shaft and adapted for driving association with the axial coniform recess in said rotatable spool, means for axially moving said rotatable shaft to thereby move said frictional driving element into and out of the driving association aforesaid, means for enabling the rotation of said rotatable shaft, and normally stationary means for adjusting the axial disposition of said rotatable shaft.

7. In a fishing reel, a stationary cylindrical element, a rotatable spool mounted peripherally of said stationary cylindrical element and providing an axial coniform recess, a rotatable shaft extending through said stationary cylindrical element, a coniform frictional driving element carried by said rotatable shaft and adapted for driving association with the axial coniform recess in said rotatable spool, means for axially moving said frictional driving element into and out of the driving association aforesaid, means for enabling the rotation of said rotatable shaft in one direction, means operable by the opposite rotation of said rotatable shaft to influence said frictional driving element out of driving association with the axial coniform recess in said rotatable spool, and normally stationary means for adjusting the axial disposition of said frictional driving element.

8. In a fishing reel, a stationary cylindrical element, a rotatable spool mounted peripherally of said stationary cylindrical element and providing an axial coniform recess, a rotatable shaft extending through said stationary cylindrical element, a coniform frictional driving element secured to said rotatable shaft and adapted for driving association with the axial coniform recess in said rotatable spool, means for axially moving said rotatable shaft to thereby move said frictional driving element into and out of the driving association aforesaid, means for enabling the rotation of said rotatable shaft in one direction, means operable by the opposite rotation of said rotatable shaft to influence said frictional driving element out of driving association with the axial coniform recess in said rotatable spool, and normally stationary means for adjusting the axial disposition of said rotatable shaft.

BRYANT BANNISTER.